(12) United States Patent  (10) Patent No.: US 8,474,839 B2
Wenner                     (45) Date of Patent:     Jul. 2, 2013

(54) CONVERTIBLE WAGON CHANGING TABLE

(76) Inventor: Neil K. Wenner, Mountain Lake, MN (US)

(*) Notice: Subject to any disclaimer, the term of this patent is extended or adjusted under 35 U.S.C. 154(b) by 456 days.

(21) Appl. No.: 12/649,158

(22) Filed: Dec. 29, 2009

(65) Prior Publication Data
US 2010/0164192 A1    Jul. 1, 2010

Related U.S. Application Data

(60) Provisional application No. 61/141,058, filed on Dec. 29, 2008.

(51) Int. Cl.
    B62B 3/02           (2006.01)
(52) U.S. Cl.
    USPC ............. 280/87.05; 28/31; 28/47.35; 28/79.3
(58) Field of Classification Search
    USPC ............... 280/30, 31, 47.31, 47.34, 47.35,
                        280/47.38, 87.01, 87.05, 79.11, 79.3
    See application file for complete search history.

(56) References Cited

U.S. PATENT DOCUMENTS

| 996,636 | A | * | 7/1911 | Gabriel ................ 280/47.35 |
| 1,171,343 | A | | 2/1916 | Klok |
| 1,560,288 | A | | 11/1925 | Murvay |
| 3,322,436 | A | * | 5/1967 | Musichuk .............. 280/87.01 |
| 4,265,461 | A | | 5/1981 | Okubo |
| 4,763,799 | A | | 8/1988 | Cohn et al. |
| 4,790,559 | A | * | 12/1988 | Edmonds ................ 280/655 |
| 5,016,948 | A | | 5/1991 | Welch et al. |
| 5,186,479 | A | * | 2/1993 | Flowers ................ 280/47.35 |
| 5,234,224 | A | | 8/1993 | Kim |
| 5,294,009 | A | * | 3/1994 | Maurer et al. .......... 211/126.15 |
| 5,649,718 | A | * | 7/1997 | Groglio .................... 280/641 |
| 5,653,458 | A | | 8/1997 | Chaparian |
| 5,673,924 | A | | 10/1997 | Demick et al. |
| 6,079,719 | A | | 6/2000 | Tisbo et al. |
| 6,354,611 | B1 | * | 3/2002 | Mihalic et al. ............. 280/30 |
| 6,547,264 | B1 | * | 4/2003 | Blackburn .............. 280/47.35 |
| 6,601,860 | B2 | | 8/2003 | Potter |
| 6,708,992 | B1 | | 3/2004 | Vargas |
| 6,796,565 | B2 | * | 9/2004 | Choi et al. ............. 280/47.35 |
| 6,893,030 | B2 | * | 5/2005 | Shapiro ................. 280/47.34 |
| 7,014,200 | B2 | | 3/2006 | Calmeise et al. |
| 7,222,866 | B1 | | 5/2007 | Cahoj et al. |
| 7,963,530 | B1 | * | 6/2011 | Garcia .................... 280/30 |
| 2006/0119056 | A1 | | 6/2006 | Olsen |
| 2006/0208440 | A1 | * | 9/2006 | Clark et al. ............ 280/47.35 |
| 2007/0033730 | A1 | | 2/2007 | Bean |
| 2011/0079972 | A1 | * | 4/2011 | Watson .................... 280/47.4 |

OTHER PUBLICATIONS

Radio Flyer®, Classic Red Wagon model #18 Assembly Instruction Manual, © 2004 Radio Flyer Inc., 4 pages.
Radio Flyer®, Steel & Wood Wagons, printed on Dec. 22, 2008, 2 pages.

* cited by examiner

Primary Examiner — Katy M Ebner
Assistant Examiner — Emma K Frick
(74) Attorney, Agent, or Firm — Merchant & Gould P.C.

(57) ABSTRACT

A convertible wagon changing table includes a wheeled section, a storage section, and a body section. The wheeled section includes at least one wheel. The storage section defines a storage volume, and is connectable to the wheeled section at a first end. The body section includes a support surface and is connectable to the storage section at the second end. The wheeled section and the body section are also detachable from the storage section and connectable together to form a wagon separate from the storage section.

2 Claims, 13 Drawing Sheets

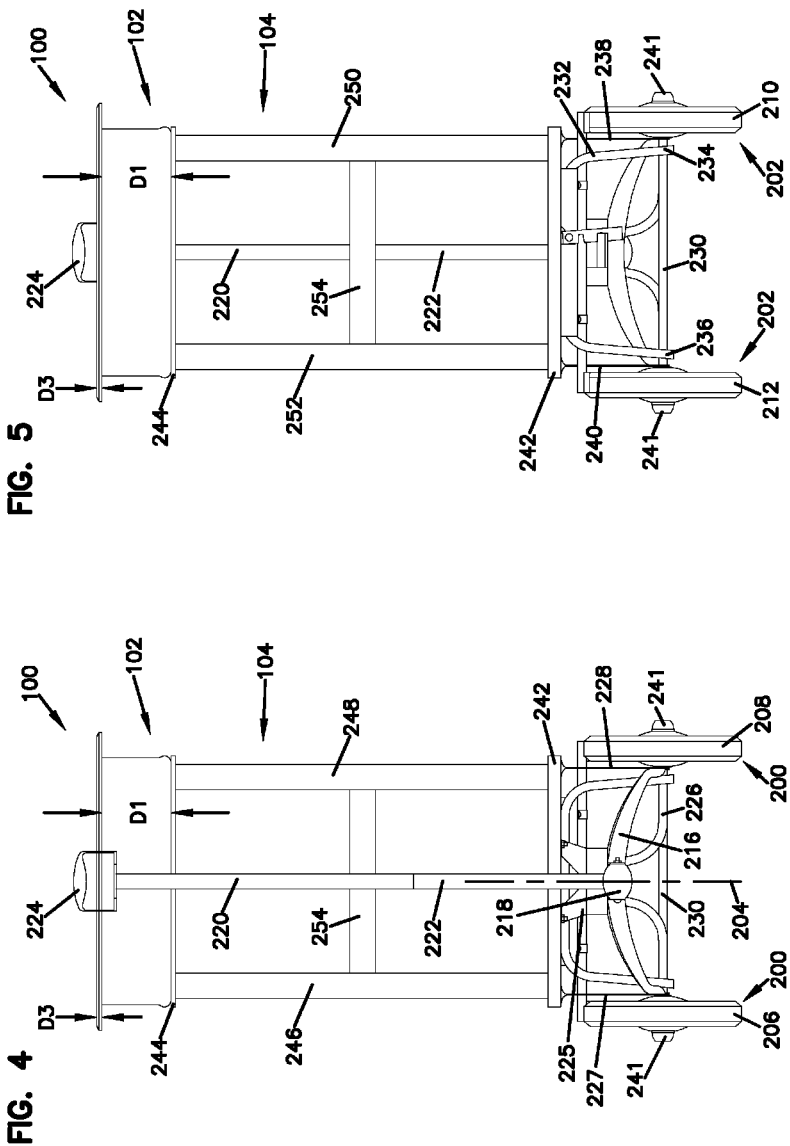

CONVERTIBLE WAGON CHANGING TABLE

CROSS REFERENCE TO RELATED APPLICATIONS

This application claims priority to U.S. Provisional Application Ser. No. 61/141,058 filed on Dec. 29, 2008, entitled CONVERTIBLE WAGON CHANGING TABLE, the disclosure of which is incorporated by reference herein in its entirety.

BACKGROUND

Changing tables are useful pieces of furniture, particularly for those caring for babies and younger children. Changing tables support the child in an elevated position that is more convenient for the caregiver, such as when changing the child's diaper or clothing. As a child grows, however, changing tables become less useful to the caregiver. For example, once a child is no longer wearing diapers, and has developed to the point where the child can assist with changing his or her clothing, the changing table becomes less useful. At this point, the changing table is often sold or given to another caregiver that has a young child. Alternatively, the changing table may simply be discarded.

SUMMARY

In general terms, this disclosure is directed to a convertible wagon changing table. In one possible configuration and by non-limiting example, the convertible wagon changing table includes a wagon section and a connectable storage unit. The changing table is convertible between a combined state in which the unit forms a changing table and an uncombined state including a wagon and a separate storage unit.

One aspect is a kit including a plurality of components, which when assembled, form a convertible wagon changing table. The convertible wagon changing table includes a wheeled section, a body section, and a storage section. The wheeled section includes at least one wheel. The body section includes a support surface and is attachable to the wheeled section to form a wagon. The storage section defines a storage volume. The storage section is connectable between the wheeled section and the body section to form a changing table that is arranged and configured to support a child on the support surface of the body section.

Another aspect is a convertible wagon changing table including a wheeled section, a storage section, and a body. The wheeled section includes at least one wheel. The storage section defines a storage volume. The storage section is detachably connected to the wheeled section at a first end and includes an opposing second end. The body section includes a support surface and is detachably connected to the storage section at the second end. The wheeled section and the body section are detachable from the storage section and connectable together to form a wagon separate from the storage section.

A further aspect is a method of converting a changing table. The method includes: detaching a wheeled section from a first end of a storage section, the wheeled section including at least one wheel; detaching a body section from a second end of the storage section, the second end opposing the first end, the body section including a support surface; and connecting the wheeled section directly to the body section to form a wagon from the wheeled section and the body section.

BRIEF DESCRIPTION OF THE DRAWINGS

FIG. 4 is a front view of the example convertible wagon changing table of FIG. 1.

FIG. 5 is a rear view of the example convertible wagon changing table of FIG. 1.

DETAILED DESCRIPTION

Figure 1:
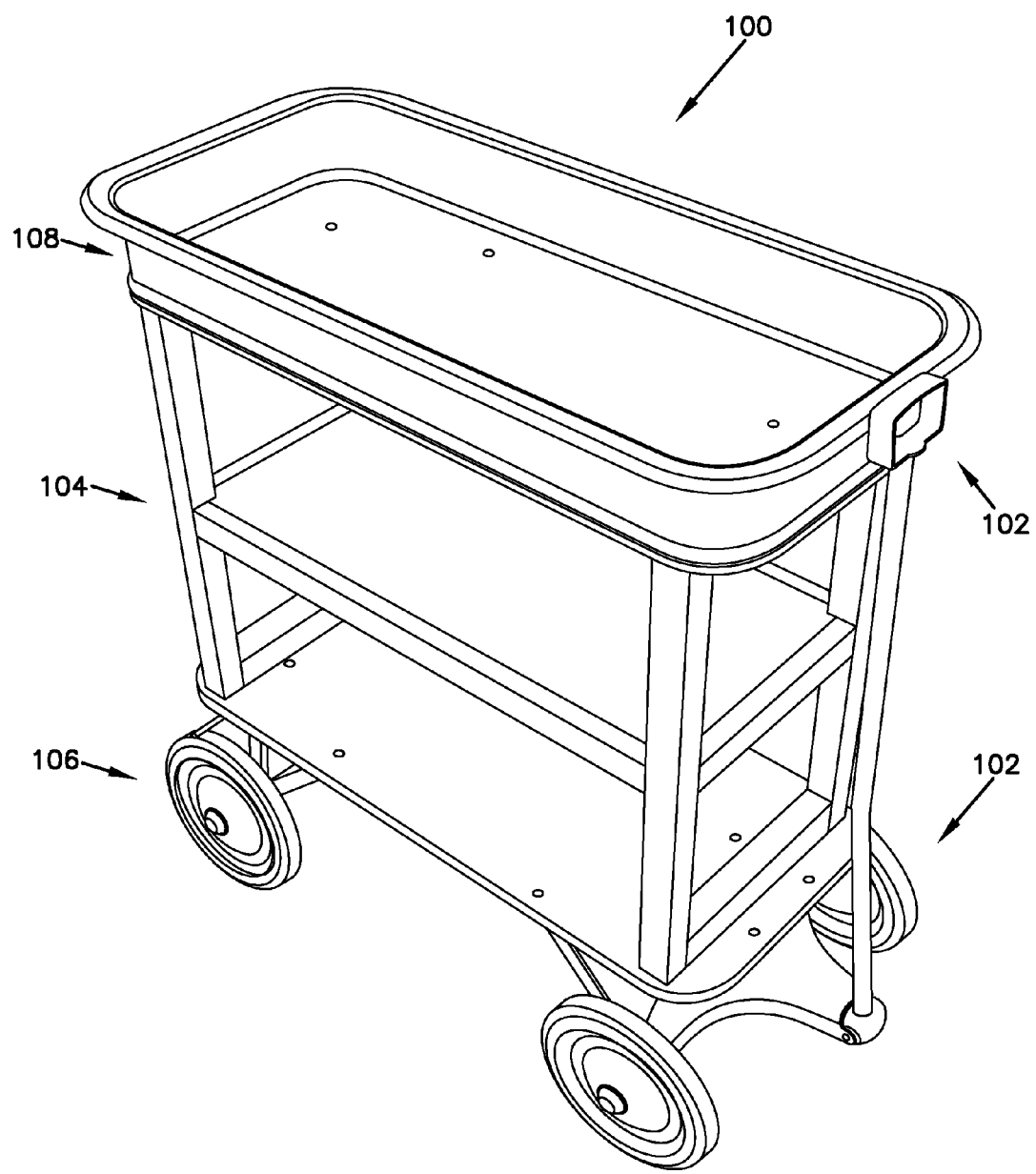
FIG. 1 is a perspective view of an example convertible wagon changing table.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Terms such as "top," "bottom," "left," "right," etc. are sometimes used in this disclosure and may also be used in the appended claims. These terms are meant to serve as a frame of reference for the accompanying drawings, and to denote an orientation of a portion or element of the wagon changing table when the portion or element is in the assembled configuration shown in the drawings, and when the portion or element is properly configured for use. The terms are not intended to describe the orientation of the portion or element when in a pre-assembled or storage configuration, such as when in the original packaging.

Some embodiments of a convertible wagon changing table include two primary components: a wagon section and a storage section, which can be arranged in a first configuration in which the wagon section and the storage section are combined to form a wagon changing table, and can be arranged in a second configuration in which the wagon section and the storage section are disconnected from each other and form a separate wagon and storage unit. FIG. 1 is a perspective view of an example convertible wagon changing table 100. Convertible wagon changing table 100 includes a wagon section 102 and a storage section 104. In some embodiments, wagon section 102 includes two primary sections, wheeled section 106 and body section 108.

In some embodiments, the convertible wagon changing table 100 is convertible between two primary configurations, including a first configuration and a second configuration.

The first configuration is shown in FIG. 1, in which the convertible wagon changing table 100 is arranged as a changing table.

The first configuration includes the following components and connections. Wheeled section 106 forms a lower support structure for wagon changing table 100. In some embodiments, wheeled section 106 includes wheels that are configured to support the wagon changing table 100 on a floor or the ground. The wheeled section 106 is also configured to support storage section 104 at an opposing end, such as in a spaced relationship to the floor or the ground. Storage section 104 is rigidly fastened to wheeled section 106 in some embodiments. Storage section 104 defines a storage volume for storing objects therein. Some embodiments include one or more storage shelves or drawers arranged within the storage volume. Body section 108 is rigidly fastened to storage section 104 in some embodiments, such that body section 108 is spaced from the wheeled section 106. Body section 108 is sized and shaped to support a child therein. Therefore, when in the first configuration, body section 108 provides support platform that is elevated from the floor or ground to support the child in a convenient position for a caregiver, such as to reduce allow the caregiver to stand and reduce the amount of bending required by the caregiver while interacting with the child. Some embodiments of convertible wagon changing table 100 further include a second configuration. When in the second configuration, storage section 104 is removed from between body section 108 and wheeled section 106, and body section 108 is rigidly fastened to wheeled section 106. Examples of the second configuration are illustrated and described in more detail herein, such as with reference to FIGS. 9 and 10.

Figure 2:
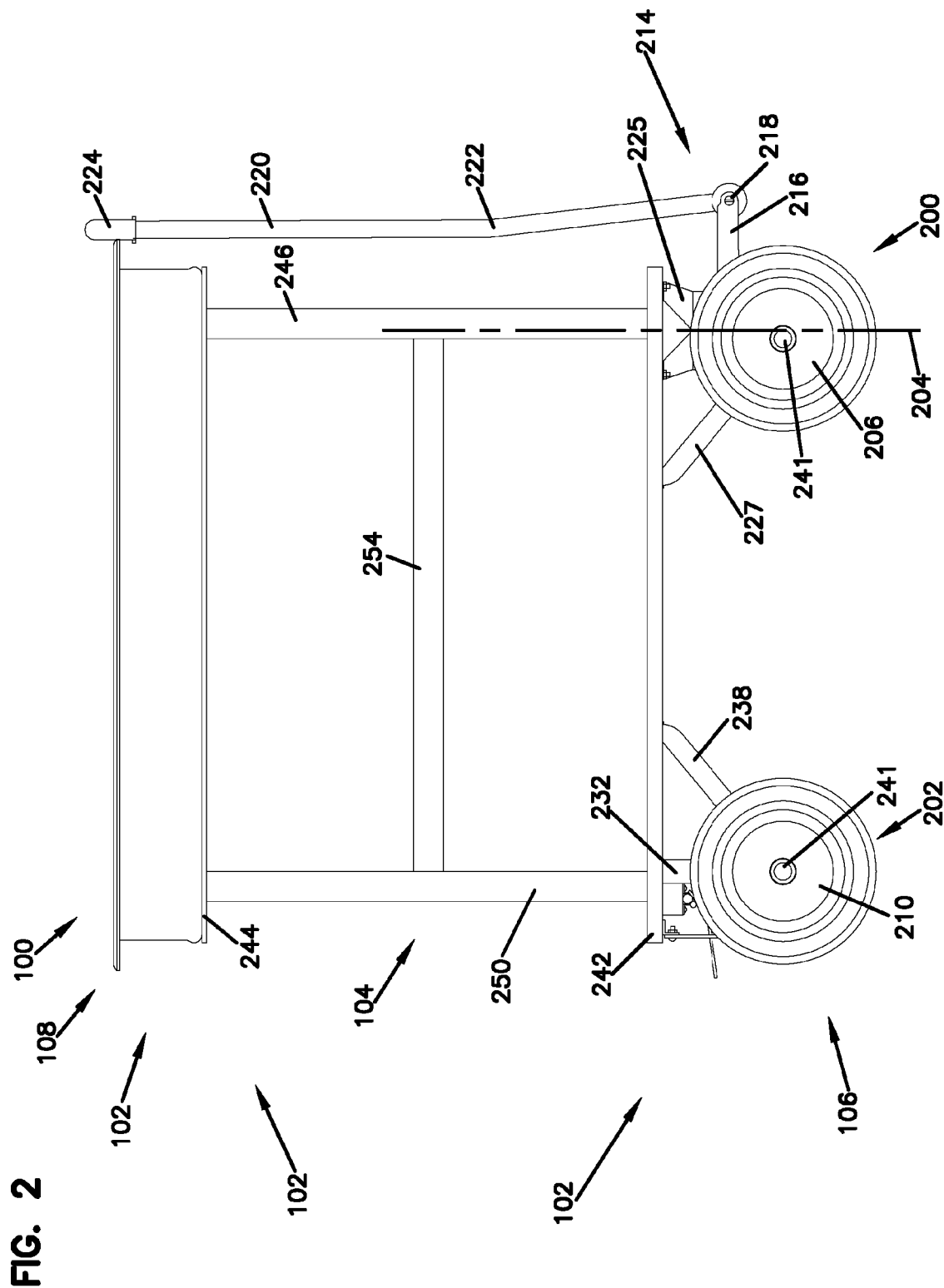
FIG. 2 is a left side view of the example convertible wagon changing table of FIG. 1.
Figure 3:
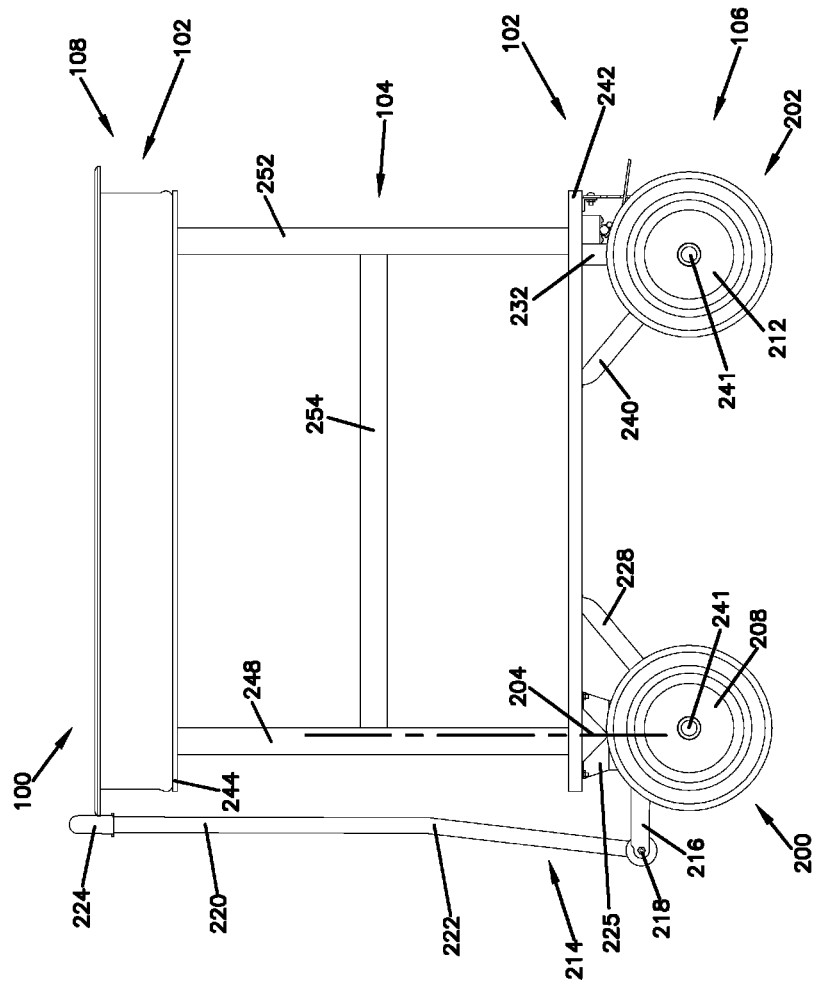
FIG. 3 is a right side view of the example convertible wagon changing table of FIG. 1.

FIGS. 2-5 illustrate the example convertible wagon changing table 100 of FIG. 1 in further detail. FIG. 2 is a left side view. FIG. 3 is a right side view. FIG. 4 is a front view. FIG. 5 is a rear view. As described above, the example convertible wagon changing table 100 includes wagon section 102 and storage section 104. In some embodiments, wagon section 102 includes two primary sections, wheeled section 106 and body section 108.

In some embodiments, wheeled section 106 includes two sets of wheels, a front wheel assembly 200 and a rear wheel assembly 202. Front wheel assembly 200 is typically arranged toward a front of convertible wagon changing table 100. In some embodiments, front wheel assembly 200 includes two wheels and is configured to pivot about axis 204, (such as a vertical axis) to permit front wheel assembly 200 to turn for steering convertible wagon changing table 100 while it is moving. Other possible embodiments include more or fewer wheels. Further, in some embodiments the front wheel assembly 200 is fixed so that it does not pivot about vertical axis 204.

Rear wheel assembly 202 is typically arranged toward a back of convertible wagon changing table 100. In some embodiments, rear wheel assembly 202 includes two wheels, while other embodiments include more or fewer wheels. In some embodiments, rear wheel assembly 202 does not turn for steering, but rather is fixed to prevent pivoting about a vertical axis. Some embodiments, however, do include a pivoting rear wheel assembly 202, or wheels that can pivot about a substantially vertical axis.

In this example, front wheel assembly 200 includes a front wheel 206 on the left side and a front wheel 208 on the right side. Rear wheel assembly 202 includes a rear wheel 210 on the left side and a rear wheel 212 on the right side. In example embodiments, wheels 206, 208, 210, and 212 include solid center hubs and outer rubber tires. In some embodiments, the outer rubber tires are solid and rigid, while in other embodiments they are inflatable. In some embodiments, wheels 206, 208, 210, and 212 are made of wood, plastic, metal, rubber, composite material, or combinations of these. In some embodiments, wheels 206 and 208 are connected by an axle 230 (such as shown in FIG. 3), and wheels 210 and 212 are connected by another axle 230. In other possible embodiments, wheels 206, 208, 210, and 212 are not connected by axles. In some embodiments, wheels 206, 208, 210, and 212 are swivel casters.

Some embodiments include a steering device 214 that is connected to front wheel assembly 200. In this example, steering device 214 includes tongue 216, joint 218, and handle 220. Handle 220 is connected to tongue 216 at joint 218, and includes bend 222 and grip 224. Steering device 214, including tongue 216, joint 218, and handle 220 is preferably made out of a strong rigid material such as metal (e.g., steel, iron, aluminum, titanium, etc.), wood, carbon fiber, fiberglass, plastic, composite material, or combinations of these or other materials. In example embodiments, handle 220 bends inward toward storage section 104 at bend 222. The inward bend 222 causes a center of mass of handle 220 to be vertically aligned slightly rearward of joint 218, which enables handle 220 to remain in the upright position when resting against body section 108. In other embodiments, however, handle 220 bends outward away from storage section 104 at bend 222. Other possible embodiments include a straight handle 220 that does not include bend 222.

In some embodiments, handle 220 can be arranged in two different configurations, including an inwardly bent configuration and an outwardly bent configuration. When in the inwardly bent configuration, handle 220 bends inward toward storage section 104 at bend 222. When in the outwardly bent configuration, handle 220 bends outward away from storage section 104 at bend 222. In these embodiments, the handle 220 is reconfigurable by being disconnected from joint 218, removed, flipped around, and reattached to joint 218 so that it bends the opposite way. Reconfiguration can be performed, for example, when converting wagon changing table 100 between the changing table configuration and the separate wagon and storage section configuration. For example, in some embodiments the handle 220 is positioned in the inwardly bent configuration when in the changing table configuration and is positioned in the outwardly bent configuration when arranged as a separate wagon. As noted above, it is advantageous to have handle 220 bending inward toward storage section 104 at bend 222 when convertible wagon changing table 100 is in a changing table configuration, so that handle 220 can lean against body section 108 and not fall to the ground, even if handle 220 is not secured. In some embodiments, however, handle 220 is secured in the upright position. In other embodiments, handle 220 is secured in some other manner. In addition, it is advantageous to be able to flip the handle 220 so that it bends outward away from storage section 104 at bend 222 when convertible wagon changing table 100 is in the separate wagon and storage unit configuration. For example, this configuration causes handle 220 to bend, making it easier to pull and turn the separate wagon. In particular, if a user is positioned on or within body section 108, the outwardly bent configuration allows handle 220 to be more easily accessed by the user to permit the user to steer the wagon.

In example embodiments, front wheel 206 of front wheel assembly 200 is connected to front wheel 208 of front wheel assembly 200 by a front wheel axle 226. Front wheel axle 226 also connects front wheel 206 of front wheel assembly 200 and front wheel 208 of front wheel assembly 200 to tongue 216. Front wheel axle 226 is preferably made out of a strong rigid material such as metal (e.g., steel, iron, aluminum, titanium, etc.), wood, carbon fiber, fiberglass, plastic, composite material, or combinations of these or other materials. In some embodiments, front wheel axle 226 is longer than the width of either storage section 104 or body section 108, so that front wheel 206 and front wheel 208 extend further out than either storage section 104 or body section 108, further stabilizing convertible changing table 100.

In example embodiments, moving steering device 214 from side to side pivots front wheel assembly 200 about axis 204, because front wheel assembly 200 is attached to tongue 216 by front wheel axle 226. Tongue 216 is connected to storage section 104 by a pivoting steering connector 225. In some embodiments, pivoting steering connector 225 is centered about axis 204. In some embodiments pivoting steering connector 225 is not connected directly to storage section 104, but is instead connected to a wheeled section platform, which is then connected to storage section 104.

Convertible wagon changing table 100 can be easily moved from one location to another using wheeled section 106.

In some embodiments, front wheel assembly 200 is locked in place to minimize play in tongue 216, pivoting steering connector 225, and front wheel axle 226 and for further stabilization of convertible wagon changing table 100 when in the changing table configuration. In these example embodiments, front wheel assembly 200 is locked in place by left and right support members 227 and 228. In some embodiments, left support member 227 is connected near front wheel 206 and right support member 228 is connected near front wheel 208. In some embodiments, left support member 227 and right support member 228 are used to lock front wheel assembly 200 in place, preventing them from rotating, further stabilizing convertible wagon changing table 100 while in its changing table configuration. Left support member 227 and right support member 228 are preferably made out of a strong rigid material such as metal (e.g., steel, iron, aluminum, titanium, etc.), wood, carbon fiber, fiberglass, plastic, a composite material, or a combination of these or other materials.

In other embodiments, there is only a minimal amount of play in tongue 216, pivoting steering connector 225, and front wheel axle 226. In these embodiments, the sway and other movement of body section 108 of convertible wagon changing table 100 is minimal such that it is unnecessary to utilize left support member 227 and right support member 228. In example embodiments, tongue 216, pivoting steering connector 225, and front wheel axle 226 are bolstered by being constructed of stronger, rigid materials, such that play is minimized. Not requiring left support member 227 or right support member 228 is advantageous because tongue 216 can pivot using pivoting steering connector 225, thereby turning front wheel assembly 200 of convertible wagon changing table 100 in changing table configuration, while still only having a minimal amount of play.

In example embodiments, rear wheel 210 of rear wheel assembly 202 is connected to rear wheel 212 of rear wheel assembly 202 by a rear wheel axle 230. Rear wheel axle 230 is preferably made out of a strong rigid material such as metal (e.g., steel, iron, aluminum, titanium, etc.), wood, carbon fiber, fiberglass, plastic, a composite material, or combinations of these or other materials. In example embodiments, rear wheel assembly 202 is connected to storage section 104 by U-shaped support member 232. Rear wheel axle 230 is threaded through aperture 234 and aperture 236 of U-shaped support member 232 before rear wheel 210 and rear wheel 212 are attached to rear wheel axle 230.

In some embodiments, rear wheel assembly 202 is further stabilized by left support member 238 and right support member 240. In some embodiments, left support member 238 is connected near rear wheel 210 and right support member 240 is connected near rear wheel 212. Left support member 238 and right support member 240 offer added support and stability to rear wheel assembly 202. U-shaped support member 232, left support member 238, and right support member 240 are preferably made out of a strong rigid material such as metal (e.g., steel, iron, aluminum, titanium, etc.), wood, carbon fiber, fiberglass, plastic, a composite material, or a combination of these or other materials. In some embodiments, U-shaped support member 232, left support member 238, and right support member 240 are not connected directly to storage section 104, but are instead connected to a wheeled section platform, which is then connected to storage section 104. In example embodiments having a separate wheeled section platform, convertible wagon changing table 100 is more easily converted from its changing table configuration to its separate wagon and storage unit configuration. In some embodiments, rear wheel axle 230 is longer than the width of either storage section 104 or body section 108, so that rear wheel 210 and rear wheel 212 extend further out than either storage section 104 or body section 108, further stabilizing convertible changing table 100.

In example embodiments, wheels 206 and 208 are attached to front wheel axle 226 by wheel caps 241. In example embodiments, wheel caps 241 permanently connect front wheels 206 and 208 to front wheel axle 226. In example embodiments, wheels 210 and 212 are attached to rear wheel axle 230 by wheel caps 241. In example embodiments, wheel caps 241 permanently connect wheels rear 210 and 212 to rear wheel axle 230. In example embodiments, once wheel caps 241 are attached to each of wheels 206, 208, 210, and 212, the wheel is permanently locked in place (while permitting wheels 206, 208, 210, and 212 to roll with or about axle 230). In example embodiments, the wheel connector includes a housing having a cavity that accepts an end of front wheel axle 226 or rear wheel axle 230. In example embodiments, an end of front wheel axle 226 or rear wheel axle 230 is threaded through wheels 206, 208, 210, or 212 and one of wheel caps 241 is placed on the end of front wheel axle 226 or rear wheel axle 230.

In example embodiments, wheel caps 241 connected to rear wheels 210 and 212 are permanently affixed once attached. In example embodiment, modified wheel caps 241 are used to connect front wheels 206 and 208 to front wheel axle 226. These modified wheel caps 241 do not permanently connect front wheels 206 and 208 to front wheel axle 226. Instead, front wheel axle 226 has threads on each end and wheel caps 241 for front wheels 206 and 208 have corresponding threads. Front wheels 206 and 208 are then placed on front wheel axle 226 and the modified wheel caps 241 are screwed onto the threaded ends of front wheel axle 226. In example embodiments, the modified wheel caps 241 are lock nuts. These modified wheel caps 241 are removable, to allow the front wheels 206 and 208 to be removed.

In some embodiments, the ability for the operator to remove and reattach front wheels 206 and 208 is important because wheels 206 and 208 must be removed before installing or uninstalling left support member 227 or right support member 228. In other embodiments, it is not necessary to remove wheels 206 and 208 before installing or uninstalling left support member 227 or right support member 228.

In other embodiments, all of wheel caps 241 are removable, such as including threads corresponding to threads on front wheel axle 226 and rear wheel axle 230. All of wheels 206, 208, 210, and 212 are easily removable because they are connected with modified wheel caps 241 that can easily be screwed and unscrewed from front wheel axle 226 and rear wheel axle 230 by operator. Having all four wheels easily removable is advantageous to allow convertible wagon changing table 100 to be more fully disassembled for storage and transport.

In some embodiments, storage section 104 includes a storage base 242, a storage top 244, and a plurality of storage supports. Specifically, some embodiments of storage section 104 include a storage support 246, a storage support 248, a storage support 250, and a storage support 252. In example embodiments, storage support 246 is disposed generally above front wheel 206 and between storage base 242 and storage top 244. In example embodiments, storage support 248 is disposed generally above front wheel 208 and between storage base 242 and storage top 244. In example embodiments, storage support 250 is disposed generally above rear wheel 210 and in between storage base 242 and storage top 244. In example embodiments, storage support 252 is disposed generally above rear wheel 212 and in between storage base 242 and storage top 244. In example embodiments, storage section 104 also includes a center shelf 254 disposed between storage base 242 and storage top 244 and connected to storage support 246, storage support 248, storage support 250, and storage support 252. Storage section 104, including storage base 242, storage top 244, storage support 246, storage support 248, storage support 250, and storage support 252, are preferably made out of a strong rigid material.

Figure 6:
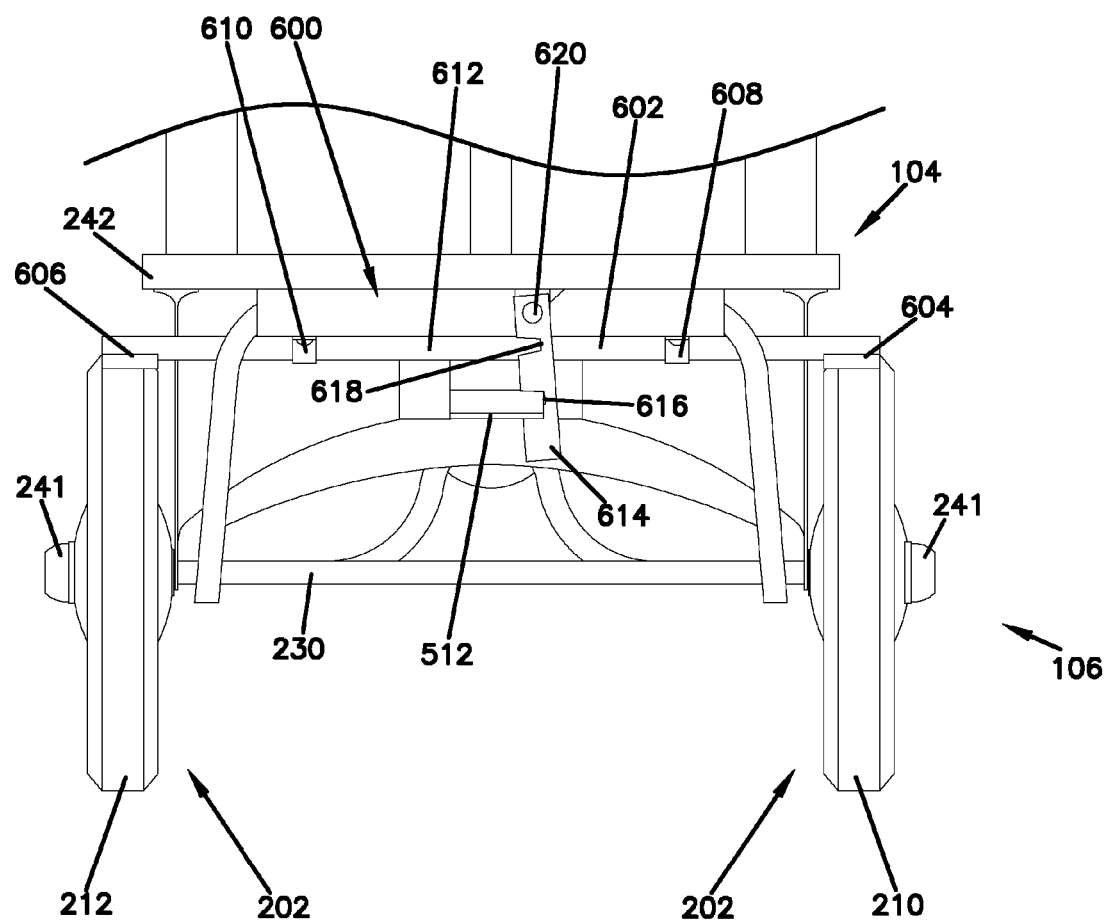
FIG. 6 is an enlarged rear view of a wheeled section of the example convertible wagon changing table of FIG. 1.
Figure 7:
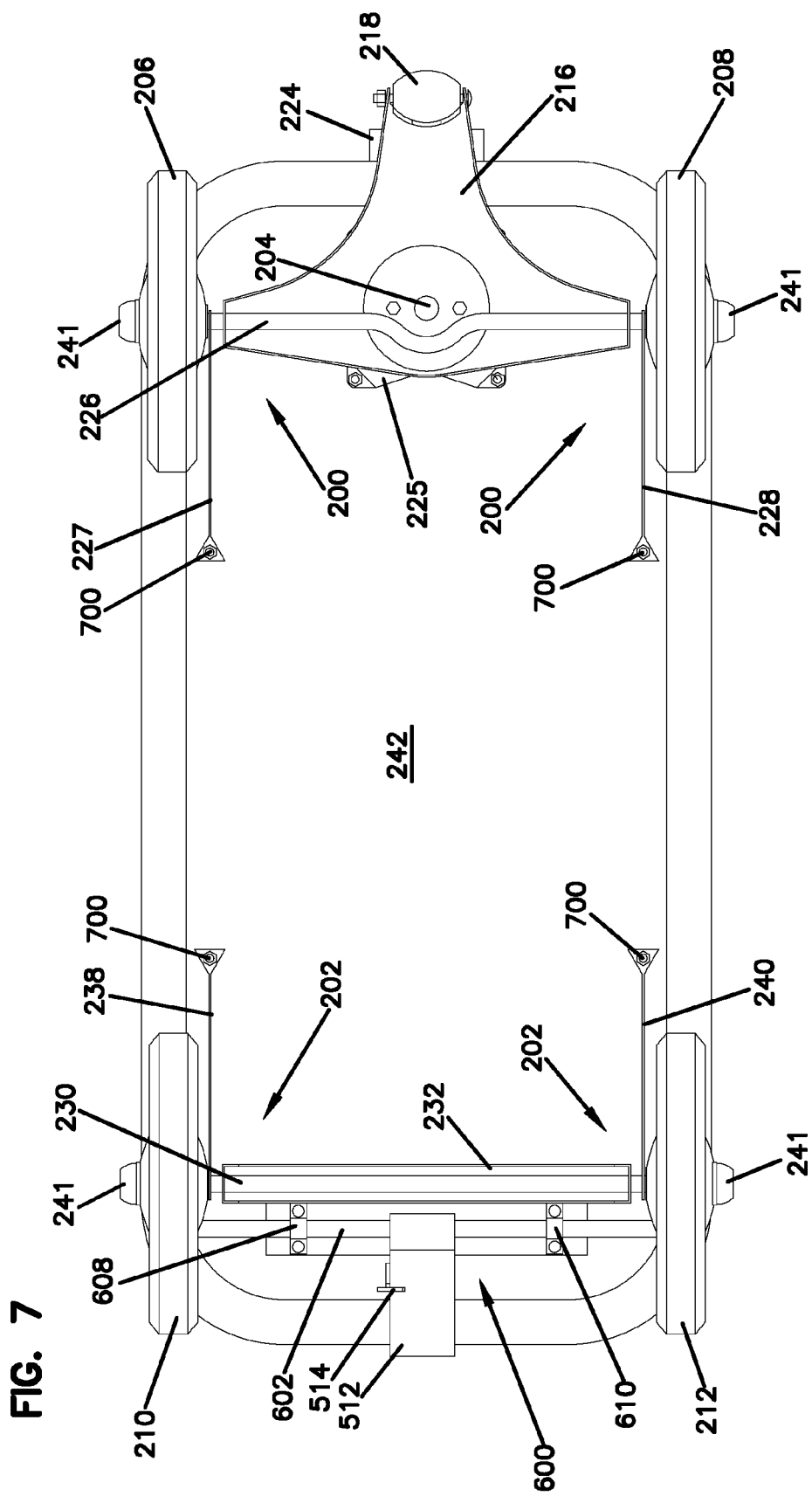
FIG. 7 is a bottom view of the example convertible wagon changing table of FIG. 1.

FIGS. 6-7 further illustrate an example of wheeled section 106 of the convertible wagon changing table 100 of FIG. 1. FIG. 6 is an enlarged rear view of wheeled section 106 of example convertible wagon changing table 100 of FIG. 1. FIG. 7 is a bottom view of example convertible wagon changing table 100 of FIG. 1. As described above, example convertible wagon changing table 100 includes a wagon section 102 and a storage section 104. In some embodiments, wagon section 102 includes a wheeled section 106. In example embodiments, wheeled section 106 includes rear wheel assembly 202, which is disposed near the rear end of wheeled section 106 of convertible wagon changing table 100.

In example embodiments, wheeled section 106 includes braking system 600, engagable with rear wheel assembly 202. In some embodiments, braking system 600 is designed to lock rear wheel 210 of rear wheel assembly 202 and rear wheel 212 of rear wheel assembly 202 in place, thereby making convertible wagon changing table 100 stationary. In example embodiments, braking system 600 can be engaged to keep convertible wagon changing table 100 stationary, making diaper changing more convenient for the user. Braking system 600 can also be disengaged, allowing convertible wagon table 100 to be easily rolled using wheels front wheel assembly 200 and rear wheel assembly 202 of wheeled section 106.

In example embodiments, braking system 600 includes an elongated braking member 602, which extends from the outside of rear wheel 210 to the outside of rear wheel 212. Braking system 600 also includes braking pad 604 which is attached to the end of elongated braking member 602 nearest rear wheel 210 and braking pad 606 which is attached to the end of elongated braking member 602 nearest rear wheel 212.

In example embodiments, braking system 600 also includes braking system fastener 608 and braking system fastener 610. Braking system fastener 608 is formed of a U-shaped member that holds elongated braking member 602 and is attached to the bottom side of storage section 104. Braking system fastener 610 also is formed of a U-shaped member that holds elongated braking member 602 and is attached to the bottom side of storage section 104. In example embodiments, braking system fastener 608 and braking system fastener 610 are attached to the bottom side of storage section 104 in such a manner that braking pad 604 is directly above rear wheel 210 and braking pad 606 is directly above rear wheel 212. In example embodiments, braking system fasteners 608 and 610 are attached to storage base 242.

In some embodiments, the wheeled section 106 includes a top plate. In some embodiments, the top plate connects the front wheel assembly 200 and the rear wheel assembly 202 together. In some embodiments, the top plate is connected to the storage base 242 of storage section 104. In some embodiments having a top plate, braking system fasteners 608 and 610 are attached to the top plate, along with front wheel assembly 200, rear wheel assembly 202, left support member 227, right support member 228, left support member 238, and right support member 240. Wheeled section top plate is then connected to storage section 104. Including the top plate is advantageous because it makes conversion between a changing table configuration and the separate wagon and storage unit configuration easier and quicker. An example of the top plate is another plate shaped and configured similar to storage base 242.

In example embodiments, left support member 227, right support member 228, left support member 238, and right support member 240 are connected to storage base 242 at connection points 700. In other examples, left support member 227, right support member 228, left support member 238, and right support member 240 are connected to the top plate at connection points 700. In some examples, these connection points 700 are connection apertures and there are corresponding connection apertures 824 (shown in FIG. 8) on the body section 108, connection apertures 1010 (shown in FIG. 10) on the storage base 242, and (if present) the top plate. In these examples, fasteners, such as nuts and bolts are threaded through the lined up connection apertures of the left support member 227, right support member 228, left support member 238, and right support member 240 at connection points 700 and then through the corresponding connection apertures on either the body section 108, the storage base 242, or the top plate of wheeled section 106 and the nuts are screwed on the other ends.

In example embodiments, and as shown in the figures, fasteners are not always required in all apertures depending on the configuration of convertible wagon changing table 100. Some apertures only line up with corresponding apertures and only are connected by fasteners when convertible wagon changing table 100 is in a combined wagon changing configuration, while other apertures only line up with corresponding apertures and only are connected by fasteners when convertible wagon changing table 100 is in a separate wagon and storage unit configuration.

In example embodiments, braking system 600 also includes brake actuator 612, which is attached in the center of elongated braking member 602, in between braking system fastener 608 and braking system fastener 610. When brake actuator 612 is pressed down, braking pad 604 comes into contact with rear wheel 210, keeping rear wheel 210 from rotating, and braking pad 606 comes into contact with rear wheel 212, keeping rear wheel 212 from rotating.

In example embodiments, braking system 600 further includes a brake actuator latch 614. Brake actuator latch 614 has a brake engaged notch 616 in it allowing the brake actuator to be depressed and locked into place by sliding brake actuator 612 into brake engaged notch 616. Brake actuator latch 614 also has brake disengaged notch 618 allowing brake actuator to be locked into a disengaged state by sliding brake actuator 612 into brake disengaged notch 618. Brake actuator latch 614 is attached to the bottom side of storage section 104. In one embodiment, brake actuator latch 614 is connected to the bottom side of storage section 104 at a pivot point 620. Brake actuator latch 614 can then be placed into position by pivoting around pivot point 620. In example embodiments, braking system 600 is preferably built in a way so as to allow easy engagement and disengagement of the brake with one's hand or foot.

Figure 8:
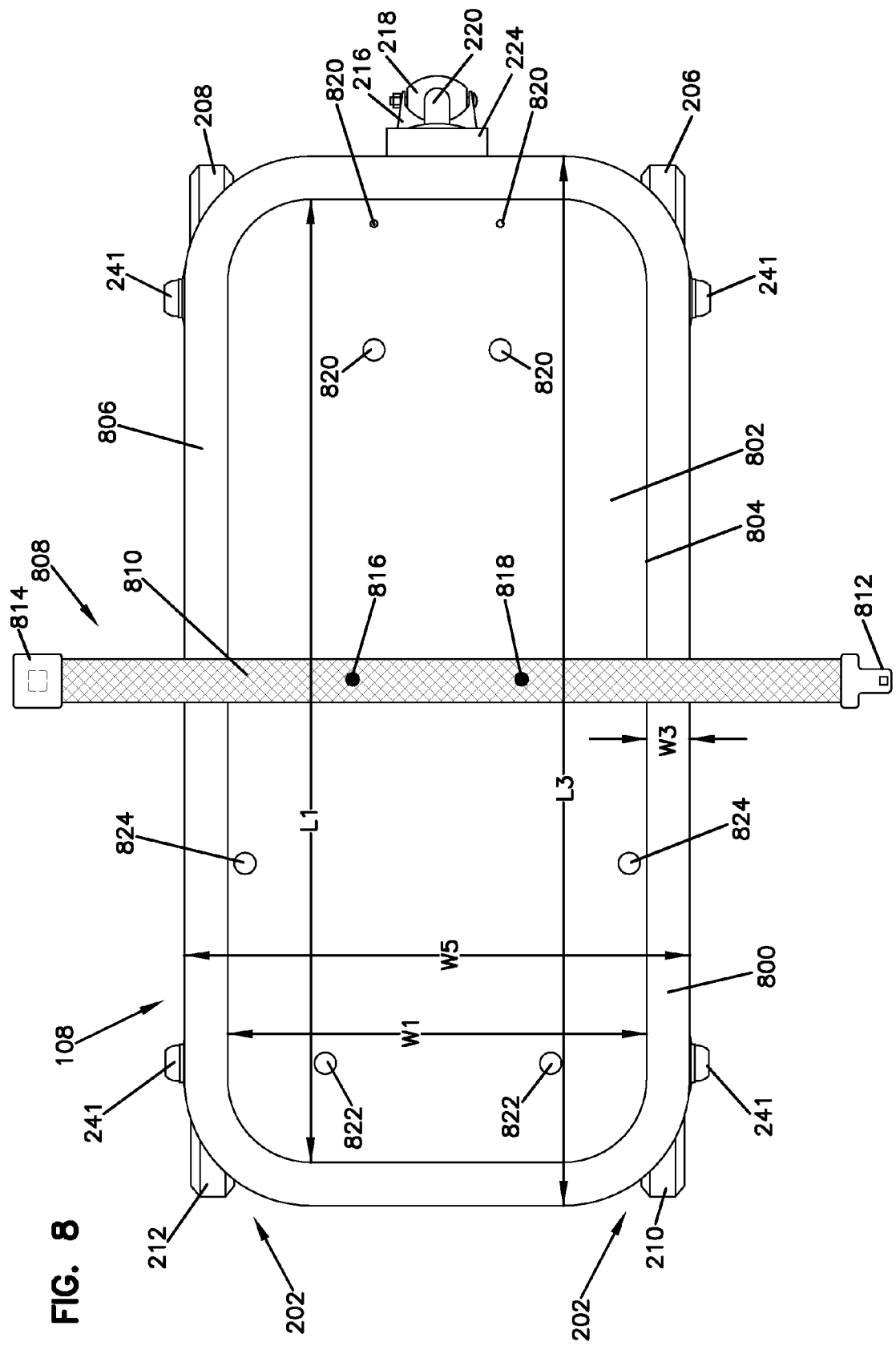
FIG. 8 is a top view of the example convertible wagon changing table of FIG. 1.

FIG. 8 is a top view of example convertible wagon changing table 100 of FIG. 1. In this example, body section 108 includes a tub 800. In example embodiments, tub 800 includes a base 802, a sidewall 804, and a rim 806. In some embodiments, tub 800, including base 802, sidewall 804, and rim 806 are made from a strong and durable material, such as metal, plastic, a composite material, or a combination of these or other materials. In example embodiments, base 802, sidewall 804, and rim 806 of tub 800 can be formed of one single piece of material or of multiple pieces of material connected together by one or more fastening methods (e.g., screws, nails, rivets, bolts, weld joints, etc.). In example embodiments, rim 806 is rounded. Various tub materials and tub construction techniques can be used.

In example embodiments, sidewall 804 extends about the perimeter of tub 800 and is attached to base 802. In some embodiments, sidewall 804 is made with a solid construction, including no slats, holes, spaces, or other sizeable openings. This solid construction of and lack of openings in of sidewall 804 reduces drafts on a child on the convertible wagon changing table 100. Also, the solid sidewall 804 helps prevent objects, such as pacifiers, bottles, diaper cream, etc. from falling through openings and off of the changing table. However, some embodiments include sidewalls that include one or more openings.

In example embodiments, base 802 of tub 800 of example convertible wagon changing table 100 has a tub base width W1 of between about 10 inches and about 20 inches. Tub base width W1 is preferably about 14.5 inches. In example embodiments, tub 800 also has a tub base length L1 of between about 20 inches and about 50 inches. Tub base length L1 is preferably about 33.25 inches. Rim 806 is connected to or part of the top side of tub 800. In example embodiments, rim 806 has a rim width W3 of between about 0.5 inch and about 3 inches. Rim width W3 is preferably consistent around the entire perimeter of tub 800. Rim width W3 is preferably about 1.5 inches. Rim 806 is configured so that it extends past sidewall 804 of tub 800.

In example embodiments, total tub width W5 is the width of tub 800, including rim 806. Total tub width W5 is between about 11 inches and about 26 inches and is preferably about 17.5 inches. In example embodiments, total tub length L3 is the length of tub 800, including rim 806. Total tub length L3 is between about 21 inches and about 56 inches and is preferably about 36.25 inches. In example embodiments, tub 800 also has a tub depth D1 (shown in FIG. 2-5) of between about 2 and about 10 inches, and preferably about 5 inches. Rim 806 also has a rim depth D3 (shown in FIG. 2-5) of between about 0.01 and about 1 inches, and preferably about 0.25 inches.

In example embodiments, body section 108 may also include a restraint device 808. In example embodiments, restraint device 808 includes a single strap 810 with a first connector 812 on a first side and second connector 814 on a second side. In example embodiments, strap 810 is attached to base 802 of tub 800 with at least one fastener. In example embodiments, two screws 816 and 818 are used to fasten strap 810 to base 802 of tub 800. First connector 812 is designed to connect with second connector 814. In example embodiments, first connector 812 and second connector 814 are connected and disconnected easily and form a safety belt. Further, restraint device 808 can be adjusted to accommodate various sizes of babies and children. In alternative embodiments, restraint device 808 includes a first strap with a first connector 812 attached to one side of body section 108 and a second strap with a second connector 814 attached to an opposite side of body section 108.

In example embodiments, body section 108 is connected to storage top 244 of storage section 104 at connection apertures 820 near the front of body section 108 and at connection apertures 822 near the back of body section 108. In example embodiments, there are four connection apertures 820 positioned around axis 204 above pivoting steering connector 225 and two connection apertures 822 positioned above U-shaped support member 232. In example embodiments, corresponding connection apertures are found on the storage base 242, storage top 244, and (if present) the top plate of wheeled section 106, as described below. In example embodiments, connection apertures 824 are included on tub 800 of body section 108 to allow the connection of left support member 227, right support member 228, left support member 238, and right support member 240 to body section 108.

Figure 9:
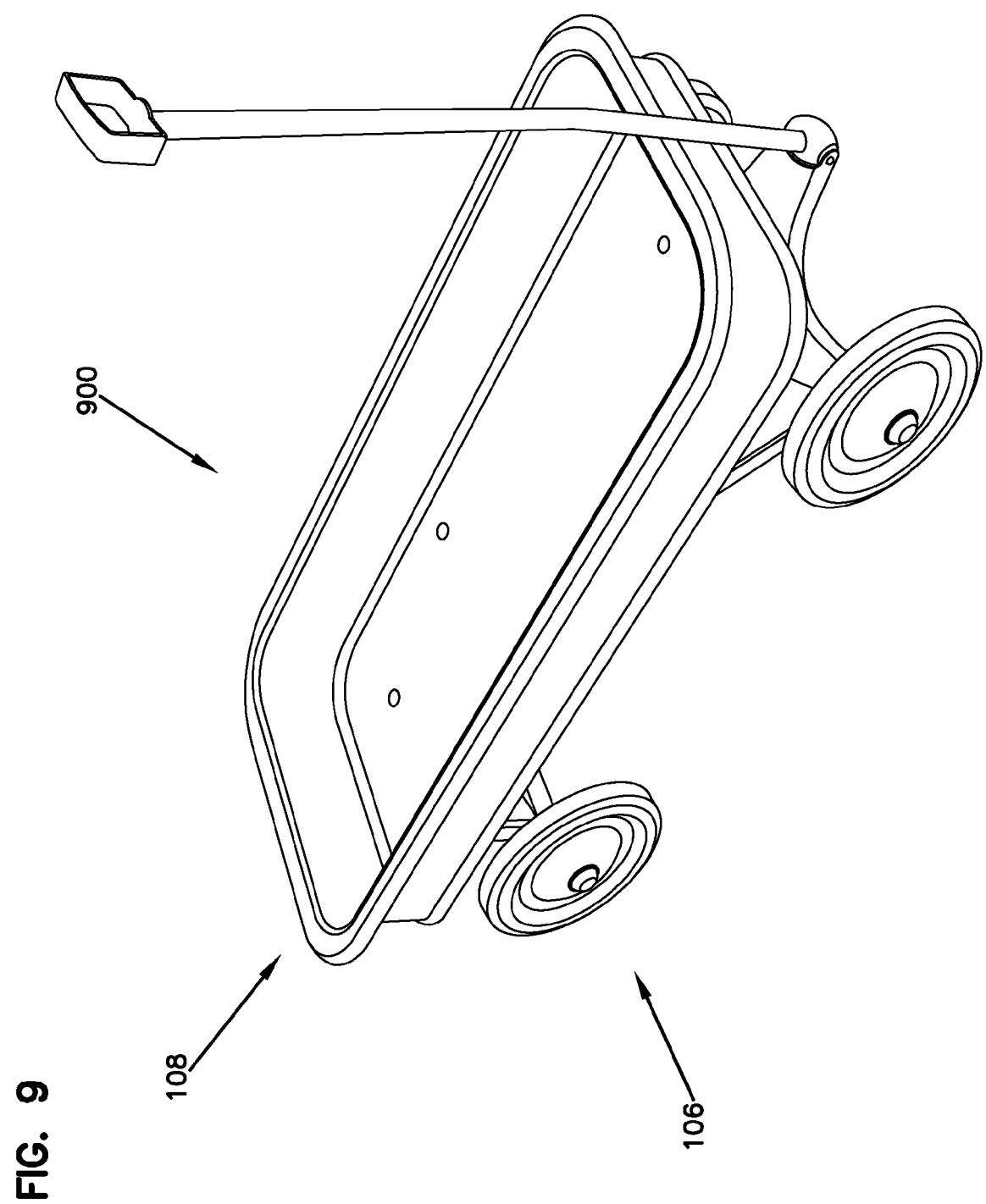
FIG. 9 is a perspective view of a separate wagon according to the present disclosure.
Figure 10:
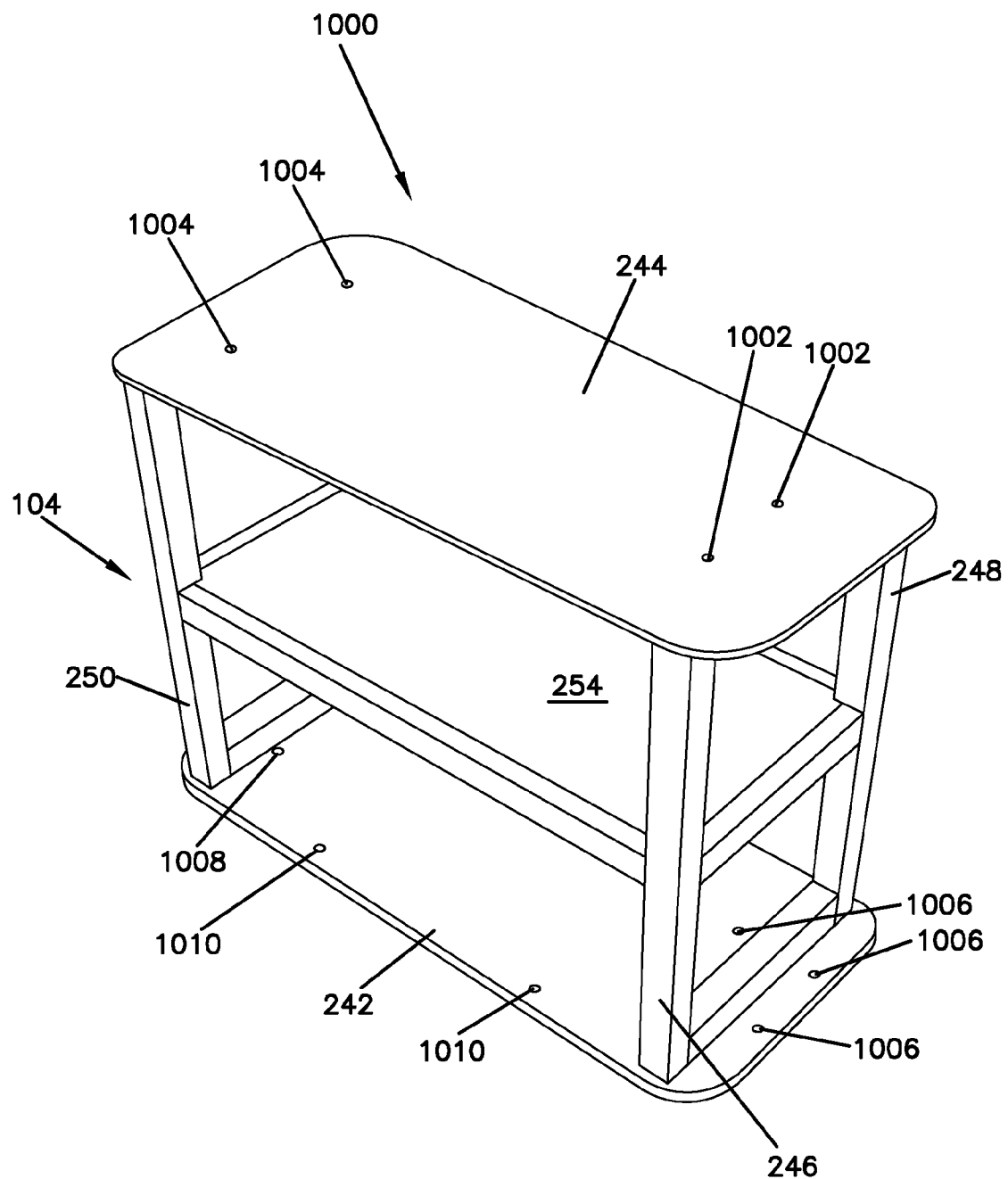
FIG. 10 is a perspective view of a separate storage unit according to the present disclosure.

FIGS. 9-10 show example embodiments of convertible wagon changing table 100 configured in a separate wagon and storage unit configuration. FIG. 9 shows a perspective view of a separate wagon configuration. FIG. 10 shows a perspective view of a separate storage unit configuration. As described above, example convertible wagon changing table 100 includes a wagon section 102 and a storage section 104. In some embodiments, wagon section 102 includes wheeled section 106 and body section 108. The convertible wagon changing table 100 can be used in a changing table configuration or in the separate wagon and storage unit configuration as shown in FIGS. 9 and 10.

FIG. 9 shows an example of wagon 900. Wagon 900 is formed, for example, by removing storage section 104 and assembling wheeled section 106 of wagon section 102 and body section 108 of wagon section 102 together. In example embodiments, wagon 900 includes elements of wagon section 102, including wheeled section 106 and body section 108. In example embodiments, wagon 900 includes all elements of wheeled section 106 and body section 108 of wagon section 102. In other embodiments, wagon 900 does not include braking system 600 or any elements of braking system 600. In the example embodiment shown in FIG. 9, left support member 227 and right support member 228 are not attached because wagon 900 does not need the added stability with its low center of gravity and because having left support member 227 and right support member 228 installed makes it so front wheel assembly 200 cannot pivot about axis 204. In some embodiments, portions of wagon 900 are formed from one of the various wagons manufactured by Radio Flyer Inc., having a place of business in Chicago, Ill. Other embodiments include other types of wagons.

FIG. 10 shows an example of storage unit 1000. In example embodiments, storage unit 1000 is created by removing storage section 104 from convertible wagon changing table 100. In example embodiments, storage unit 1000 includes elements of storage section 104, including storage base 242, storage top 244, and plurality of storage supports. Specifically, some embodiments of storage unit 1000 include a storage support 246, a storage support 248, a storage support 250, and a storage support 252. In example embodiments, storage support 246, storage support 248, storage support 250, and storage support 252 are disposed in between storage base 242 and storage top 244. In example embodiments, storage unit 1000 also includes a center shelf 254 disposed between storage base 242 and storage top 244 and connected to storage support 246, storage support 248, storage support 250, and storage support 252. Storage section 104, including storage base 242, storage top 244, storage support 246, storage support 248, storage support 250, and storage support 252, are preferably made out of a strong rigid material. FIG. 10 also shows the connection apertures in storage base 242 and storage top 244 used for connection to wheeled section 106 and body section 108.

In example embodiments, storage section 104 is connected to body section 108 at connection apertures 1002 near the front of storage top 244 of storage section 104 and at connection apertures 1004 near the back of storage top 244 of storage section 104. In example embodiments, there are four connection apertures 1002 positioned around axis 204 above pivoting steering connector 225 and two connection apertures 822 positioned above U-shaped support member 232. In example embodiments, storage section 104 is connected to wheeled section 106 at connection apertures 1002 near the front of storage base 242 of storage section 104 and at connection apertures 1008 near the back of storage base 242 of storage section 104. In example embodiments having a top plate of wheeled section 106, similar corresponding connection apertures are included in the top plate.

In example embodiments, bolts and nuts, or other fasteners, can be used to connect body section 108 with storage top 244 of storage section 104 by first aligning connection apertures 820 and 822 with corresponding connection apertures 1002 and 1004 and then threading the bolts through connection apertures 820 and 822 and corresponding connection apertures 1002 and 1004 and screwing the nuts onto the other ends of the bolts. In example embodiments, bolts and nuts, or other fasteners, can be used to connect storage base 242 of storage section 104 with wheeled section 106 by first aligning connection apertures 1006 and 1008 with corresponding connection apertures on pivoting steering connector 225 and U-shaped support member 232 and then threading the bolts through connection apertures 1006 and 1008 and connection apertures on pivoting steering connector 225 and U-shaped support member 232 and screwing the nuts onto the other ends of the bolts.

In example embodiments, connection apertures 1010 are included on storage base 242 of storage section 104 to allow the connection of left support member 227, right support member 228, left support member 238, and right support member 240 to body section 108.

In example embodiments, wagon section 102 and storage section 104 are separated from each other to create wagon 900 and storage unit 1000 through the following method. Storage section 104 is detached from wheeled section 106 and body section 108 of convertible wagon changing table 100 in a combined configuration. In example embodiments, bottom side of storage section 104 is first detached from the top side of wheeled section 106. In example embodiments, the top side of storage section 104 is next detached from the bottom side of body section 108. In example embodiments, storage section 104 is next removed from between wheeled section 106 and body section 108. In example embodiments, the top side of wheeled section 106 is finally attached to the bottom side of body section 108. This completes the conversion of the convertible wagon changing table 100 into wagon 900 and storage unit 1000. These steps can be done in several different orders. In other example embodiments the bottom of body section 108 could be detached from the top of storage section 104 before the top of wheeled section 106 is detached from the bottom of storage section 104.

Once a baby or child has reached a certain age and size, he or she may be too large to be changed on a changing table. Additionally, the baby may move too much to continue to be changed on the table. It is also possible that the child no longer requires diaper changes because he or she no longer wears diapers. At this point, the changing table has fewer uses, especially when the user of the changing table has no other children that require diaper changes. Once the changing table is no longer needed, it may be converted into separate wagon 900 and storage unit 1000. If desired, the wagon 900 and storage unit 1000 can be subsequently returned to the combined configuration.

In example embodiments, wagon 900 and storage unit 1000 are merged into convertible wagon changing table 100 in a combined configuration. In example embodiments, the top side of wheeled section 106 of wagon 900 is first detached from the bottom side of body section 108 of wagon section 102. In example embodiments, storage section 104 of storage unit 1000 is next placed between wheeled section 106 and body section 108. In example embodiments, the bottom of body section 108 is next connected with the top of storage section 104. In example embodiments, the bottom of storage section 104 is finally connected with the top of wheeled section 106. This completes the combination and conversion of wagon 900 and storage unit 1000 into convertible wagon changing table 100 in combined configuration. In other examples, the steps are completed in a number of different orders, including connecting wheeled section 106 with storage section 104 before connecting body section 108 with storage section 104.

Figure 11:
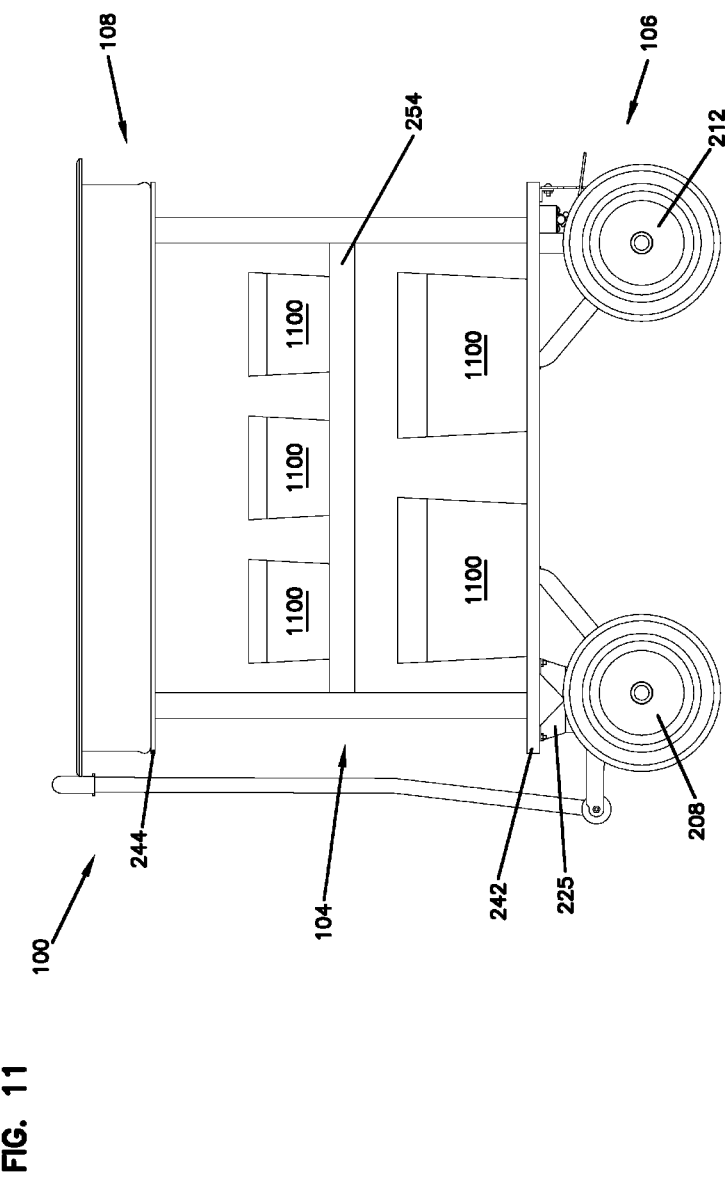
FIG. 11 is a right side view of another embodiment of the example convertible wagon changing table of FIG. 1.

FIG. 11 illustrates another embodiment of the example convertible wagon changing table 100. As described above, example convertible wagon changing table 100 includes a wagon section 102 and a storage section 104. In some embodiments, wagon section 102 includes a wheeled section 106 and a body section 108.

In example embodiments, storage section 104 includes storage base 242, storage top 244, storage support 246, storage support 248, storage support 250, storage support 252, and center shelf 254. In example embodiments, storage support 246, storage support 248, storage support 250, and storage support 252 are disposed in between storage base 242 and storage top 244. In example embodiments, center shelf 254 of storage section is disposed between storage base 242 and storage top 244 and connected to storage support 246, storage support 248, storage support 250, and storage support 252. Storage section 104, including storage base 242, storage top 244, storage support 246, storage support 248, storage support 250, and storage support 252, are preferably made out of a strong rigid material.

In example embodiments, such as shown in FIG. 11, storage base and storage shelf have a plurality of baskets 1100 placed on them for storage instruments and materials useful in changing a diaper. Plurality of baskets 1100 can include baskets of various sizes, as shown in FIG. 11. In some embodiments of convertible wagon changing table 100, storage section 104 is detachable and removable from wagon section 102. In some embodiments, storage section 104 includes shelving. In other embodiments, the shelving includes or is replaced with another type of storage section, such as drawers. In other embodiments, storage section 104 includes side walls, additional shelves, etc. This added flexibility makes convertible wagon changing table 100 a versatile and multifaceted tool that can be used for various purposes as the child grows.

In example embodiments, storage section 104 of convertible wagon changing table 100 has telescoping or accordion style shelving instead of rigid shelving. In example embodiments including telescoping or accordion style shelving, the convertible wagon changing table 100 becomes even more portable. Instead of physically removing storage section 104, storage section 104 is collapsed, thereby converting convertible wagon changing table 100 from a changing table configuration to a wagon configuration. In these examples, convertible wagon changing table 100 can more easily be converted between a changing table configuration and a wagon configuration.

Figure 12:
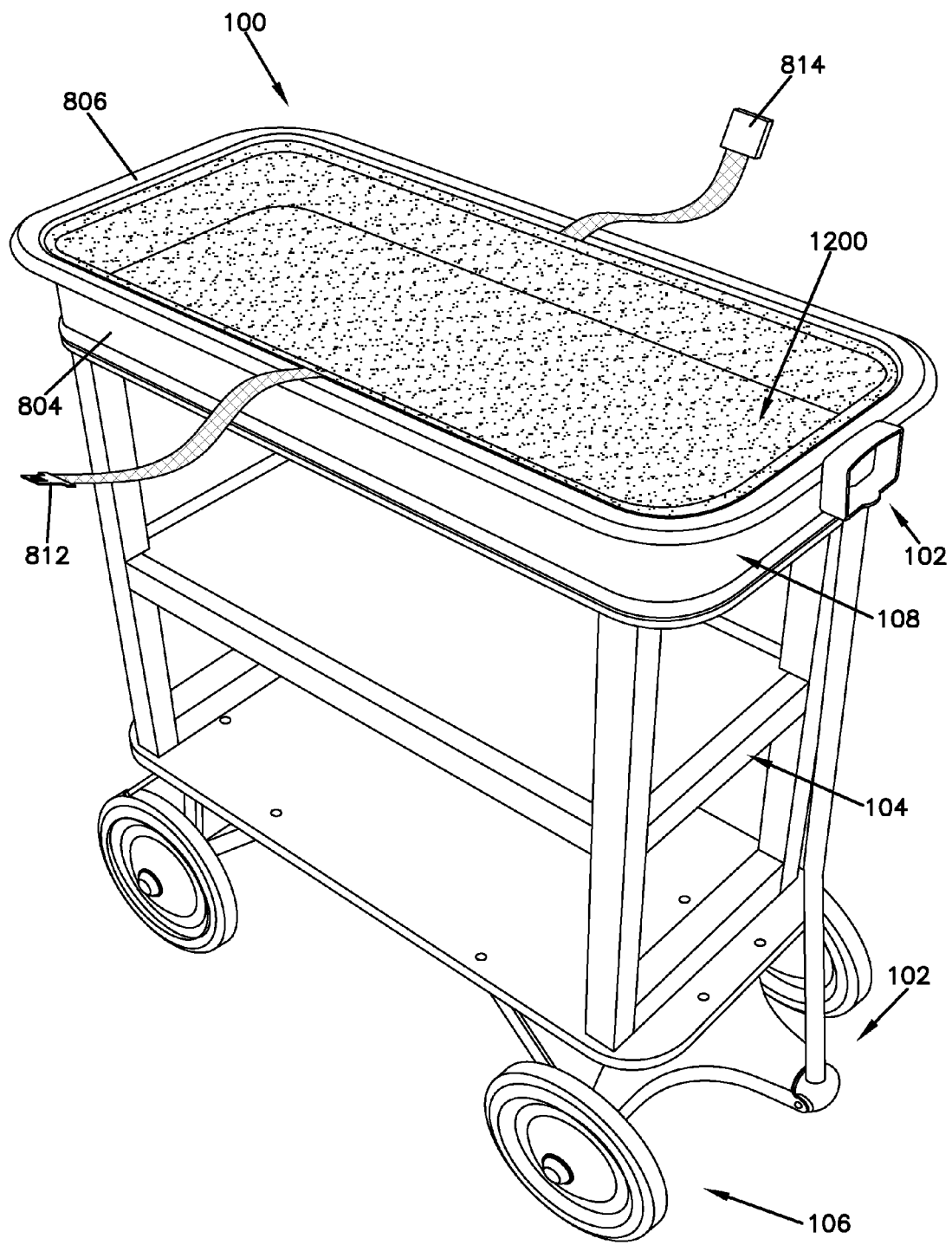
FIG. 12 is a perspective view of another embodiment of the example convertible wagon changing table of FIG. 1.

FIG. 12 illustrates another embodiment of example convertible wagon changing table 100. As described above, example convertible wagon changing table 100 includes a wagon section 102 and a storage section 104. In some embodiments, wagon section 102 includes a wheeled section 106 and a body section 108. In example embodiments, wheeled section 106 includes rear wheel assembly 202, which is disposed near the rear end of wheeled section 106 of convertible wagon changing table 100.

In example embodiments, body section 108 includes a liner 1200. In specific embodiments, the liner may include a padding layer or material. Liner 1200 is placed in tub 800 so that the baby will have a comfortable place to lie during the diaper changing. The padding may be made from any appropriate material, including foam or batting. In example embodiments, liner 1200, including the padding, is removable and washable. In example embodiments, liner 1200 is positioned on base 802 of tub 800. In example embodiments, liner 1200 extends up sidewall 804 of tub 800. In example embodiments, liner 1200 extends to the top of sidewall 804 and covers rim 806. In these embodiments, liner 1200 covers all the hard surfaces of convertible wagon changing table 100, such that a baby placed on convertible wagon changing table 100, is less likely to hit a hard surface with his or her head, arms, or legs. In example embodiments, liner 1200 is form fitted to easily slip onto tub 800, covering the interior of tub 800, including base 802 and sidewall 804, as well as rim 806.

As illustrated before, example embodiments also include restraint device 808. In example embodiments, restraint device 808 includes a single strap 810 with a first connector 812 on a first side and second connector 814 on a second side. In example embodiments, strap 810 is attached to base 802 of tub 800 with at least one fastener. In example embodiments, first connector 812 is designed to connect with second connector 814.

Figure 13:
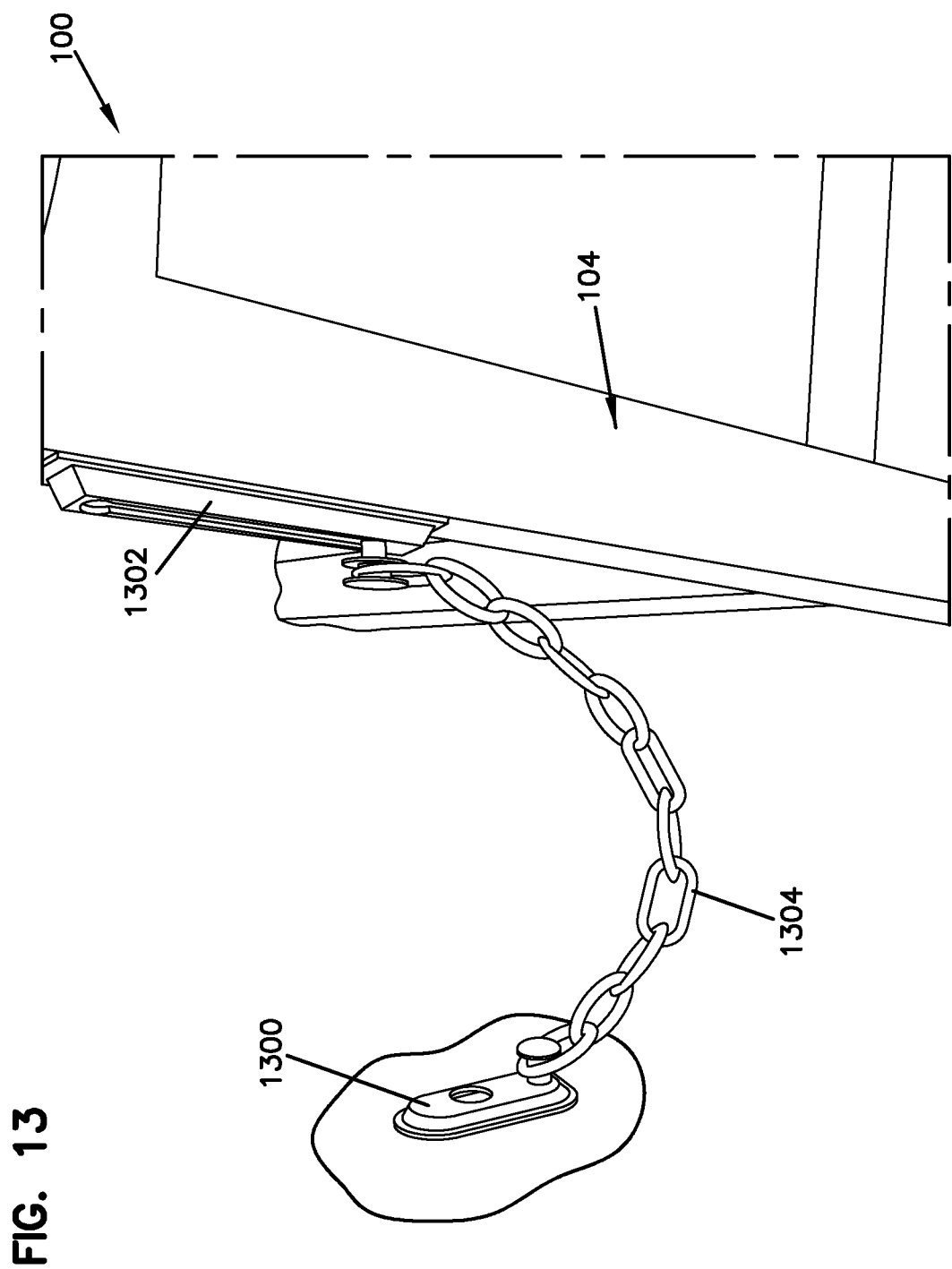
FIG. 13 is a perspective view of a wall fastening assembly of another embodiment of the example convertible wagon changing table of FIG. 1.

FIG. 13 illustrates another embodiment of the example convertible wagon changing table 100. As described above, example convertible wagon changing table 100 includes a wagon section 102 and a storage section 104. In some embodiments, wagon section 102 includes a wheeled section 106 and a body section 108. In example embodiments, at least one wall anchor 1300 is attached to a nearby wall and a changing table anchor 1302 is attached to convertible wagon changing table 100 and wall anchor 1300 and changing table anchor 1302 are connected together with anchor chain 1304. In example embodiments, the convertible changing stable is further stabilized by anchoring convertible changing table 100 to a wall using wall anchor 1300, changing table anchor 1302, and anchor chain 1304.

Figure 14:
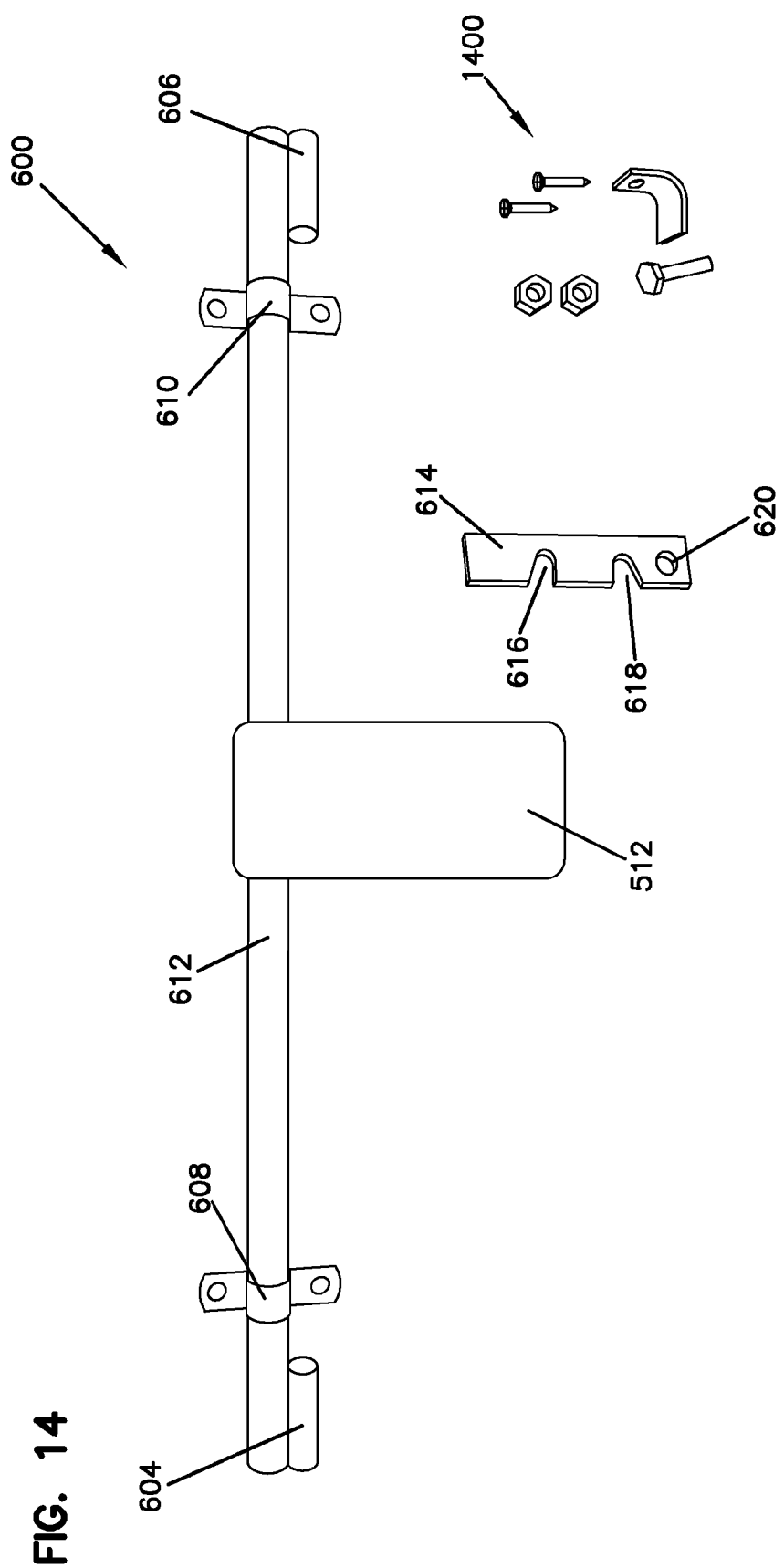
FIG. 14 is an exploded view of an example braking system according to the present disclosure.

FIG. 14 illustrates an exploded view of the elements of an example braking system 600. As mentioned above in example embodiments, wheeled section 106 includes braking system 600, which can be engaged with rear wheel assembly 202 and is designed to lock rear wheel assembly 202 in place, thereby making convertible wagon changing table 100 stationary.

In example embodiments, braking system 600 includes an elongated braking member 602, which extends from the outside of rear wheel 210 to the outside of rear wheel 212. Braking system 600 also includes braking pad 604 which is attached to a first end of elongated braking member 602 and braking pad 606 which is attached to a second end of elongated braking member 602. In example embodiments, braking system 600 also includes braking system fastener 608 and braking system fastener 610. Braking system fastener 608 comprises a U-shaped member which holds elongated braking member 602. Braking system fastener 610 also comprises a U-shaped member which holds elongated braking member 602.

In example embodiments, braking system 600 also includes brake actuator 612, which is attached in the center of elongated braking member 602, in between braking system fastener 608 and braking system fastener 610. When brake actuator 612 is pressed down, braking pad 604 comes into contact with a first wheel, keeping the first wheel from rotating, and braking pad 606 comes into contact with a second wheel, keeping the second wheel from rotating.

In example embodiments, braking system 600 further includes a brake actuator latch 614. Brake actuator latch 614 has a brake engaged notch 616 in it allowing the brake actuator to be depressed and locked into place by sliding brake actuator 612 into brake engaged notch 616. Brake actuator latch 614 also has brake disengaged notch 618 allowing brake actuator to be locked into a disengaged state by sliding brake actuator 612 into brake disengaged notch 618. Brake actuator latch 614 can then be placed into position by pivoting around pivot point 620.

In example embodiments, braking system 600 further comprises other fastening hardware 1400. Specifically, fastening hardware 1400 is used to connect braking system 600 to wheeled section 106 of convertible wagon changing table 100. In example embodiments, fastening hardware 1400 includes nuts, bolts, screws, and brackets. In other embodiments, fastening hardware 1400 includes other types of fastening hardware.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A convertible wagon changing table comprising:
   a body section comprising a base and sidewalls extending from the base, the base having formed therein:
      a first set of body connection apertures; and
      a second set of body connection apertures;
   a wheeled section comprising:
      a front wheel assembly including:
         a front axle;
         two front wheels rotatably connected to opposing ends of the front axle;
         a tongue coupled to the axle;
         a pivoting steering connector pivotally connected to the tongue of the wheeled section to permit the tongue and front axle to pivot about a steering axis; and
         a handle pivotally connected to the tongue at a joint, wherein the handle is configured to receive a steering input from a user, the steering input operable to steer the front wheel assembly by causing the tongue and front axle to pivot about the steering axis;
a rear wheel assembly including:
a rear axle;
two rear wheels rotatably connected to opposing ends of the rear axle; and
a support member coupled to the rear axle; and
a braking assembly arranged and configured to selectively apply a force to the rear wheels to resist rotation of the rear wheels about the rear axis; and
a storage section defining a storage volume configured to store objects therein, the storage section comprising:
a storage top having formed therein:
a first set of storage top connection apertures; and
a second set of storage top connection apertures;
a storage base having formed therein:
a first set of storage base connection apertures; and
a second set of storage base connection apertures;
storage supports connected to and extending between the storage top and the storage base; and
at least one shelf positioned between the storage top and the storage base and connected to the storage supports;
wherein the convertible wagon changing table is convertible between a changing table configuration and a wagon and separate storage structure configuration,
wherein when the convertible wagon changing table is in the changing table configuration:
the body section is connected to the storage top with fasteners extending through the first set of body connection apertures and the first set of storage top connection apertures, and with fasteners extending through the second set of body connection apertures and the second set of storage top connection apertures; and
the wheeled section is connected to the storage base by fasteners connecting the pivoting steering connector of the front wheel assembly to the storage base using the first set of storage base connection apertures, and by fasteners connecting the support member of the rear wheel assembly to the storage base using the second set of storage base connection apertures; and
wherein when the convertible wagon changing table is in the wagon and separate storage structure configuration:
the storage top and the storage base are both disconnected from the wheeled section and the body; and
the body section is connected to the pivoting steering connector of the front wheel assembly using the first set of body connection apertures, and is connected to the support member of the rear wheel assembly using the second set of body connection apertures.

2. The convertible wagon changing table of claim 1, further comprising:
support members configured to be connected between the axle of the front wheel assembly and the storage base to prevent the tongue and front axle of the the front wheel assembly from pivoting about the steering axis when the convertible wagon changing table is in the changing table configuration;
a liner including a padding material, the liner shaped and configured to cover the base and sidewalls of the body section when the convertible wagon changing table is in the changing table configuration;
a restraining device including at least one strap and a releasable fastener, the restraining device coupled to the body section and arranged and configured to restrain a child on the body section when the convertible wagon changing table is in the changing table configuration; and
a stabilizing assembly including at least one wall anchor, a changing table anchor, and a chain, wherein the wall anchor is configured to be securely connected to a wall, the changing table anchor is configured to be securely connected to the body section or the storage section, and the chain is configured to be connected between the wall anchor and the changing table anchor, wherein the wall anchor, changing table anchor, and chain are configured to be securely connected when the wagon changing table is in the changing table configuration.

* * * * *